(12) United States Patent
Sullivan et al.

(10) Patent No.: US 10,092,795 B2
(45) Date of Patent: Oct. 9, 2018

(54) GOLF BALL LAYERS INCLUDING VERY NEUTRALIZED POLYMERS AND METHODS FOR MAKING SAME

(71) Applicant: Acushnet Company, Fairhaven, MA (US)

(72) Inventors: Michael J. Sullivan, Old Lyme, CT (US); Mark L. Binette, Mattapoisett, MA (US); Robert Blink, Newport, RI (US); David A. Bulpett, Boston, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/522,843

(22) Filed: Oct. 24, 2014

(65) Prior Publication Data

US 2016/0114218 A1    Apr. 28, 2016

(51) Int. Cl.
| | | |
|---|---|---|
| A63B 37/12 | (2006.01) | |
| A63B 37/00 | (2006.01) | |
| C08L 23/08 | (2006.01) | |
| C08K 5/098 | (2006.01) | |

(52) U.S. Cl.
CPC ...... *A63B 37/0024* (2013.01); *A63B 37/0023* (2013.01); *A63B 37/0039* (2013.01); *A63B 37/0043* (2013.01); *A63B 37/0075* (2013.01); *A63B 37/0078* (2013.01); *A63B 37/0087* (2013.01); *A63B 37/0092* (2013.01); *C08K 5/098* (2013.01); *C08L 23/08* (2013.01); *C08L 23/0876* (2013.01); *A63B 37/0003* (2013.01)

(58) Field of Classification Search
CPC ............ A63B 37/0003; A63B 37/0023; A63B 37/0038; A63B 37/0024; C08L 23/08; C08L 23/0876
See application file for complete search history.

(56) References Cited

U.S. PATENT DOCUMENTS

| | | | | |
|---|---|---|---|---|
| 6,063,869 A | * | 5/2000 | Kashiwagi | A63B 37/0003 473/372 |
| 6,756,436 B2 | | 6/2004 | Rajagopalan et al. | 524/322 |
| 6,894,098 B2 | | 5/2005 | Rajagopalan et al. | 524/322 |
| 2005/0215718 A1 | * | 9/2005 | Rajagopalan | A63B 37/08 525/221 |
| 2005/0261424 A1 | * | 11/2005 | Snell | A63B 37/0003 525/7 |
| 2006/0030668 A1 | * | 2/2006 | Egashira | A63B 45/00 525/221 |

(Continued)

OTHER PUBLICATIONS

Thermal Tech Equipment—Tech Page.*

(Continued)

*Primary Examiner* — John E Simms, Jr.
(74) *Attorney, Agent, or Firm* — Mandi B. Milbank (57) ABSTRACT

The present invention relates to golf balls having at least one layer formed from a very neutralized polymer composition. In particular, the compositions of the invention include at least one acid copolymer and a sufficient amount of cation source to neutralize about 70 percent to about 80 percent of the acid moieties. The invention also relates to methods of making the compositions and golf ball constructions that incorporate the compositions of the invention in at least a portion thereof.

4 Claims, 3 Drawing Sheets

(56) References Cited

U.S. PATENT DOCUMENTS

| | | | |
|---|---|---|---|
| 2006/0105858 A1* | 5/2006 | Kennedy, III | A63B 37/0003 473/371 |
| 2006/0172823 A1* | 8/2006 | Loper | A63B 37/0003 473/371 |
| 2006/0252577 A1* | 11/2006 | Sullivan | A63B 37/0003 473/354 |
| 2008/0274826 A1* | 11/2008 | Manami | A63B 37/0003 473/373 |
| 2009/0176601 A1* | 7/2009 | Snell | A63B 37/0003 473/376 |
| 2009/0325733 A1* | 12/2009 | Morken | A63B 37/0095 473/378 |
| 2010/0144465 A1* | 6/2010 | Sullivan | A63B 37/0003 473/373 |
| 2010/0160078 A1* | 6/2010 | Kim | A63B 37/0031 473/372 |
| 2011/0263351 A1* | 10/2011 | Shigemitsu | A63B 37/0003 473/371 |
| 2011/0275456 A1* | 11/2011 | Sullivan | A63B 37/0003 473/373 |
| 2012/0122608 A1* | 5/2012 | Bulpett | A63B 37/0003 473/371 |
| 2012/0129632 A1* | 5/2012 | Sullivan | A63B 37/0031 473/376 |
| 2012/0283039 A1* | 11/2012 | Chen | A63B 37/0003 473/373 |
| 2013/0172115 A1* | 7/2013 | Shigemitsu | C08F 20/02 473/373 |

OTHER PUBLICATIONS

Compressions by Any Other Name—Jeff Dalton.*
Dalton, Jeff, *Compression by Any Other Name, Science and Golf IV, Proceedings of the World Scientific Congress of Golf* (Eric Thain ed., Routledge, 2002) ("J. Dalton").

* cited by examiner

GOLF BALL LAYERS INCLUDING VERY NEUTRALIZED POLYMERS AND METHODS FOR MAKING SAME

FIELD OF THE INVENTION

The present invention relates to golf balls, and more particularly to golf balls having at least one layer formed from a very neutralized polymer ("VNP") composition and methods for making same.

BACKGROUND OF THE INVENTION

Golf ball manufacturers have been able to vary a wide range of playing characteristics, such as compression, velocity, and spin, by altering the composition of the golf ball. Depending on the layer and desired performance, golf ball layers may be constructed with a number of polymeric compositions and blends, including polybutadiene rubber, polyurethanes, polyamines, and ionomers. For example, golf ball manufacturers have been using ethylene-based ionomers for golf ball component materials because of their durability, rebound, and scuff resistance characteristics. These ionomers are distinguished by the type of metal ion, the amount of acid, and the degree of neutralization.

Those of ordinary skill in the art are aware that increasing the neutralization of ethylene-based ionomers during manufacturing reduces the processability of the material. In fact, depending upon the cation(s) present, once the neutralization is greater than about 60 percent, the melt flow index of the ionomer is decreased to the point that the material does not flow at all under normal processing conditions. As a result, commercially available ethylene-based ionomers are generally only partially neutralized.

More recently, however, highly-neutralized polymers ("HNPs") have been found to be suitable materials for golf ball layers due to their excellent performance properties. The acid groups in these polymers are typically neutralized to high levels, e.g., greater than about 80 percent. However, the high neutralization levels still present difficulties under normal processing conditions. In addition, customization of HNPs is difficult because the specific base resins used to make the HNPs are not generally commercially available.

Accordingly, there remains a need for ionomer compositions that are neutralized at high percentages, but in a manner that still allows the use of the resultant polymer compositions in golf ball components. Advantageously, the compositions of the present invention may be made into golf ball layers having enhanced resiliency, durability, and compression.

SUMMARY OF THE INVENTION

The present invention is directed to a golf ball including at least one layer formed from a composition including an acid copolymer having at least ethylene and a $C_{3-8}$ $\alpha,\beta$-ethylenically unsaturated carboxylic acid; a cation source present in an amount sufficient to neutralize about 70 percent to about 80 percent of all acid groups; and an organic acid or salt thereof. In one embodiment, the acid copolymer is selected from ethylene/acrylic acid/n-butyl acrylate, ethylene/methacrylic acid/n-butyl acrylate, ethylene/acrylic acid/methyl acrylate, ethylene/methacrylic acid/methyl acrylate, ethylene/acrylic acid/ethyl acrylate, or ethylene/methacrylic acid/ethyl acrylate; the cation source is magnesium; and the organic acid is a fatty acid selected from stearic acid, behenic acid, erucic acid, oleic acid, linoleic acid, or combinations thereof.

In this aspect of the invention, the composition may further include at least one additional polymer component selected from bimodal ionomers, ionomers modified with rosins, polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, or alkyl acrylate rubbers.

In one embodiment, the golf ball of the present invention has a coefficient of restitution of about 0.750 to about 0.850. For example, the coefficient of restitution may range from about 0.770 to about 0.815. In addition, the golf ball of the present invention may have an Atti compression of about 55 to about 110. Further, the golf ball layer formed from the composition of the invention has a hardness of about 25 Shore D to about 70 Shore D and a hardness of about 50 Shore C to about 80 Shore C.

The present invention is also directed to a golf ball including an inner core; a cover layer disposed about the inner core; and an intermediate layer disposed between the inner core and the cover layer, where the intermediate layer is formed from a composition including an acid copolymer having at least ethylene, a $C_{3-8}$ $\alpha,\beta$-ethylenically unsaturated carboxylic acid, and a softening comonomer, where the carboxylic acid is acrylic acid or methacrylic acid; a cation source present in an amount sufficient to neutralize about 72 percent to about 78 percent of all acid groups, where the cation source is magnesium; and an organic acid or salt thereof. In one embodiment, the organic acid is a fatty acid selected from stearic acid, behenic acid, erucic acid, oleic acid, or lineolic acid. For example, the fatty acid is stearic acid or oleic acid.

In one embodiment, the golf ball has a coefficient of restitution of about 0.780 to about 0.825. Additionally, the composition may further include at least one additional polymer component selected from the group consisting of bimodal ionomers, ionomers modified with rosins, polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, or alkyl acrylate rubbers.

The present invention is further directed to a golf ball including a core; an outer cover layer disposed about the core, where the outer cover layer is formed from a composition including an acid copolymer having at least ethylene, a $C_{3-8}$ $\alpha,\beta$-ethylenically unsaturated carboxylic acid, and a softening comonomer, where the carboxylic acid is acrylic acid or methacrylic acid and the softening comonomer is n-butyl acrylate, methyl acrylate, or ethyl acrylate; a cation source present in an amount sufficient to neutralize about 70 percent to about 80 percent of all acid groups, where the cation source is magnesium; a fatty acid including stearic acid, oleic acid, or mixtures thereof; and at least one non-acid polymer; and an inner cover layer disposed between the core and the outer cover layer.

In one embodiment, the non-acid polymer is selected from polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, or alkyl acrylate rubbers. In another embodiment, the golf ball has a coefficient of restitution of about 0.750 to about 0.815 and an Atti compression of about 55 to about 110. In addition, the inner cover layer has a hardness of about 40 Shore D to about 70 Shore D.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

The present invention is directed to "very" neutralized polymer ("VNP") compositions and golf balls including at least one layer formed from a VNP composition. The VNP compositions of the present invention include at least one acid copolymer and a sufficient amount of cation source to neutralize about 70 percent to about 80 percent of the acid moieties. In another embodiment, the VNP compositions of the present invention include at least a highly neutralized polymer ("HNP") and an acid-containing component such that the resulting VNP composition includes from about 70 percent to about 80 of neutralized acid groups. The VNP compositions may optionally include additives, fillers, melt flow modifiers, and combinations thereof. The VNP compositions of the present invention offer numerous benefits over known HNPs, such as better processability and improved melt flow, with minimal sacrifice to other properties.

The present invention also explores the methods of making such VNP compositions. In one embodiment, the VNP compositions are prepared directly from base resins. In this aspect, the VNP compositions are formed by neutralizing the base resins with a sufficient amount of cation source, and optionally an organic acid or salt thereof, to levels of about 70 percent to about 80 percent. In another embodiment, the VNP compositions are prepared from a HNP. For example, the VNP compositions may be formed by blending a HNP with an acid-containing component to reduce the neutralization level to about 70 percent to about 80 percent.

Accordingly, the present invention is further directed to golf ball constructions that incorporate the VNPs compositions of the invention in at least a portion thereof. As discussed in more detail below, because neutralization levels in the VNP compositions of the present invention are still relatively high, golf balls including at least one layer formed from a VNP composition have desirable coefficient of restitution ("CoR") and compression values, among other superior performance properties.

The Composition

The VNPs of the present invention are ionomers and/or their acid precursors that have been partially neutralized using a sufficient cation source and optionally, an organic acid or salt thereof. In one embodiment, the acid moieties of the VNPs are neutralized about 70 percent to about 80 percent. In another embodiment, the acid moieties of the VNPs are neutralized about 72 percent to about 78 percent. In yet another embodiment, about 70 to about 75 percent of the acid moieties of the VNPs are neutralized. In still another embodiment, between about 72 percent and about 76 percent of the acid moieties of the VNPs are neutralized.

As described in greater detail below, the VNPs of the present invention may be formed in several ways. For example, in one embodiment, the VNP may be formed from a base resin reacted with a cation source. In this aspect of the invention, any acid copolymer may be used in the VNPs compositions of the invention. For example, the compositions of the invention may include an acid copolymer having the following general formula:

where $R_1$-$R_6$ and $R_8$-$R_9$ may be hydrogen, a branched or linear alkyl group, carbocyclic group, aromatic group, or heterocyclic group, where $R_7$ and $R_{11}$ may be hydrogen or a lower alkyl group, where $R_{11}$ may be any linear or branched alkyl group, preferably methyl, ethyl, propyl, butyl, pentyl, hexyl, heptyl, octyl, or isobornyl, and where x is preferably from 50 to 99 weight percent, where y is preferably 1 to 50 weight percent, and where z is preferably 0 to 50 weight percent. Thus, the term acid copolymer may refer to two or more monomers of x, y, or z above.

In one embodiment, the acid copolymers suitable for use in the present invention include copolymers of an olefin and an α,β-unsaturated carboxylic acid. More specifically, the acid copolymers may be described as E/X copolymers, where E is an α-olefin and X is a $C_{3-8}$ α,β-ethylenically unsaturated carboxylic acid.

In another embodiment, the acid copolymers of the present invention may be described as E/X/Y copolymers, where E is an α-olefin, X is a $C_{3-8}$ α,β-ethylenically unsaturated carboxylic acid, and Y is a softening monomer.

In this aspect, E may be ethylene or propylene, preferably ethylene. X may be a α,β-ethylenically unsaturated carboxylic acid. The acid is preferably selected from (meth)acrylic acid, ethacrylic acid, maleic acid, crotonic acid, fumaric acid, or itaconic acid. (Meth)acrylic acid is particularly preferred. As used herein, the term "(meth)acrylic" includes both methacrylic and acrylic.

Y may be a softening comonomer, preferably alkyl acrylate and methacrylate, where the alkyl groups have from 1 to 8 carbon atoms. In this aspect, the softening comonomer may be selected from the group consisting of vinyl esters of aliphatic carboxylic acids wherein the acids have 1 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate such as iso- or n-butyl acrylate, butyl methacrylate, or the like.

The acid polymers of the present invention include the α-olefin (E) in an amount of about 15 weight percent or greater, preferably about 25 weight percent or greater, more preferably about 40 weight percent or greater, and even more preferably about 60 weight percent or greater, based on the total weight of the acid polymer. The acid polymers of the present invention include the acid (X) in an amount from about 1 to about 40 weight percent, preferably about 5 to about 30 weight percent, and more preferably about 10 to about 20 weight percent, based on the total weight of the acid polymer. The optional softening monomer (Y) may be present in the acid polymer in an amount from about 0 to about 50 weight percent, preferably from about 5 to about 25 weight percent, and more preferably from about 10 to about 20 weight percent, based on the total weight of the acid polymer. In one embodiment, Y is present in an amount of about 5 to 35 weight percent, preferably about 5 to 30 weight percent, more preferably 8 to 25 weight percent, and most preferably 8 to 20 weight percent.

Suitable acid copolymers include, but are not limited to, those wherein the α-olefin is ethylene, the acid is (meth) acrylic acid, and the optional softening monomer is (meth) acrylate, n-butyl(meth)acrylate, isobutyl(meth)acrylate, methyl(meth)acrylate, or ethyl(meth)acrylate. Particularly preferred acid polymers include, but are not limited to, ethylene/(meth)acrylic acid/n-butyl acrylate, ethylene/(meth)acrylic acid/methyl acrylate, and ethylene/(meth)acrylic acid/ethyl acrylate.

The acid copolymers of the present invention can be prepared by any suitable method available to one of ordinary skill in the art. In one embodiment, the acid copolymers are formed from "direct" acid copolymers. In another embodiment, the acid copolymers may be prepared from copolymers polymerized by adding all monomers simultaneously. In yet another embodiment, the acid copolymers may be formed by grafting at least one acid-containing monomer onto an existing polymer. In an exemplary embodiment of the present invention, the acid copolymers are "direct" acid copolymers.

The acid copolymers of the present invention may also include those that have already been prepared and are commercially available. Examples of suitable commercially available acid polymers include, but are not limited to, NUCREL® acid polymers, commercially available from E.I. du Pont de Nemours and Company; PRIMACOR® acid polymers and XUS acid polymers, both commercially available from The Dow Chemical Company; A-C® acid polymers, commercially available from Honeywell International Inc.; and ESCOR® acid polymers, commercially available from ExxonMobil Chemical.

In another embodiment, the VNP compositions include high melt index ("MI")/low viscosity waxes. By the term, "high melt index," it is meant a relatively low melt viscosity composition having a melt index value of greater than or equal to 5.0 g/10 min, and more preferably at least 10 g/10 min (ASTM D1238, condition E at 190° C.). By the term, "low melt index," it is meant a relatively high melt viscosity composition having a melt index of less than 5.0 g/10 min. The present invention contemplates the use of acid-containing waxes having a Brookfield viscosity of less than about 1,000 cps and a density of less than 0.95 g/cc. Examples of high MI/low viscosity waxes include, but are not limited to, A-C® acid polymers, for example, A-C® 5120, commercially available from Honeywell International Inc.

In one embodiment, the VNP composition is formed by reacting the acid copolymers with a cation source, whereby the cations neutralize the acid moieties. The amount of cation source will vary depending on the desired degree of neutralization. In one embodiment of the present invention, the cation source is added in an amount sufficient to neutralize about 70 percent to about 80 percent, more preferably about 72 percent to about 78 percent, and most preferably about 75 percent. In yet another embodiment, the cation source is added in an amount sufficient to neutralize about 70 to about 75 percent of the acid moieties. In still another embodiment, the cation source is added in an amount sufficient to neutralize between about 72 percent and about 76 percent of the acid moieties.

Suitable cation sources include, but are not limited to, metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. In an exemplary embodiment, the cation source includes magnesium.

In another embodiment, the compositions of the invention include organic acids and salts thereof. Without being bound to any particular theory, it has been found that adding sufficient organic acid or salt thereof to the acid copolymer may help improve neutralization without losing processability. Similar to the cation source, the amount of organic acid or salt thereof will vary depending on the desired degree of neutralization. In one embodiment, the VNP includes an organic acid salt in an amount of about 20 phr or greater. In another embodiment, the organic salt is present in an amount of about 30 phr or greater. In yet another embodiment, the organic salt is present in an amount of about 40 phr or greater.

Suitable organic acids include, but are not limited to, aliphatic and mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic or dimerized derivatives thereof. It is preferred that the organic acids and salts of the present invention are relatively non-migratory, i.e., they do not bloom to the surface of the polymer under ambient temperatures, and non-volatile, i.e., they do not volatilize at temperatures required for melt-blending.

As discussed above, there are several methods of making the VNP compositions. As such, the second method involves the use of a HNP as the starting resin and an acid-containing component. In this aspect of the invention, the cation source is not needed. The HNP has a neutralization level of greater than 80 percent.

In this aspect of the present invention, the starting resin may be any type of HNP available to one of ordinary skill in the art, including commercially available HNPs. Suitable HNPs contemplated for use with the present invention include, but are not limited to, Dupont™ HPF 1000, Dupont™ HPF 1035, Dupont™ HPF AD 1072, Dupont™ HPF 2000, Dupont™ HPC AD1043, and Dupont™ HPC AD1022, all commercially available from E.I. du Pont de Nemours and Company. Also suitable for use in the present invention are any conventional HNPs disclosed in, for example, U.S. Pat. Nos. 6,756,436 and 6,894,098, the disclosures of which are hereby incorporated by reference.

The acid-containing component includes any type of species containing an acid group that is available to one of ordinary skill in the art. Examples of acid-containing components include, but are not limited to, fatty acids; acid-containing polymers of various molecular weights; acid-containing waxes; ionomers; and mixtures thereof.

In one embodiment, the acid-containing component is a fatty acid. Suitable fatty acids include, but are not limited to, caproic, caprylic, capric, lauric, stearic, behenic, erucic, oleic, linoleic acids, and combinations thereof. In an exemplary embodiment, the fatty acid is oleic acid or stearic acid. Additional suitable fatty acids include tall oil fatty acids, for example, SYLFAT® 2LT commercially available from Arizona Chemical.

In another embodiment, the acid-containing component is an acid-containing polymer. Any of the E/X-type or E/X/Y-type copolymers discussed above may be suitable as an acid-containing component. Also suitable are acid-containing copolymers including any commercially available ethylene/acrylic acid copolymer or terpolymer-type ionomeric resins, such as ethylene/acid/acrylate copolymers. Examples of acid-containing copolymers include A-C® 5120 commercially available from Honeywell International; ESCOR® AT320 commercially available from ExxonMobil Chemical; PRIMACOR® resins commercially available from The Dow Chemical Company; and FUSABOND® resins, SURLYN® resins, and NUCREL® resins, all of which are commercially available from E.I. du Pont de Nemours and Company.

In yet another embodiment, the acid-containing component is an acid-containing wax. Suitable acid-containing waxes include any of the acid-containing waxes discussed above in relation to the VNP compositions.

In still another embodiment, the acid-containing component is an ionomer. In this aspect, suitable ionomers include, for example, SURLYN® ionomers, commercially available from E.I. du Pont de Nemours and Company.

The VNP compositions of the present invention optionally include at least one additional polymer component in the form of a blend. In one embodiment, the additional polymer component is a non-acid polymer. Examples of additional polymer components include, but are not limited to, partially neutralized ionomers; bimodal ionomers, such as Surlyn® AD 1043, 1092, and 1022 ionomer resins, commercially available from E. I. du Pont de Nemours and Company; ionomers modified with rosins; soft and resilient ethylene copolymers; polyolefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; ionomers and ionomeric precursors, acid copolymers, and conventional HNPs; polyurethanes; grafted and non-grafted metallocene-catalyzed polymers, such as single-site catalyst polymerized polymers, high crystalline acid polymers, cationic ionomers, and combinations thereof; natural and synthetic rubbers, including, but not limited to, ethylene propylene rubber ("EPR"), ethylene propylene diene rubber ("EPDM"), styrenic block copolymer rubbers, butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (cis and trans).

The additional polymer component is present in an amount of about 50 weight percent to about 90 weight percent, preferably about 60 weight percent to about 85 weight percent, and more preferably about 70 weight percent to about 80 weight percent, based on the combined weight of the acid copolymer and the additional polymer component. In another embodiment, the VNP composition includes the additional polymer component in an amount of about 10 weight percent to about 50 weight percent, preferably about 20 weight percent to about 45 weight percent, and more preferably about 30 weight percent to about 40 weight percent, based on the combined weight of the acid copolymer and the additional polymer component.

The VNP compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, the high molecular weight organic acids and salts thereof disclosed above, polyamides, polyesters, polyacrylates, polyurethanes, polyethers, polyureas, polyhydric alcohols, and combinations thereof. Also suitable are non-fatty acid melt flow modifiers.

The VNP compositions of the present invention also optionally include additives, fillers, and combinations thereof. In one embodiment, the additives and/or fillers may be present in an amount of from 0 weight percent to about 50 weight percent, based on the total weight of the composition. In another embodiment, the additives and/or fillers may be present in an amount of from about 5 weight percent to about 30 weight percent, based on the total weight of the composition. In still another embodiment, the additives and/or fillers may be present in an amount of from about 10 weight percent to about 20 weight percent, based on the total weight of the composition.

Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof.

Methods of Making the Composition

The Base Resin Process

In one embodiment of the present invention, the VNP compositions may be prepared starting from base resins. By selecting the starting base resins, the VNP compositions may be advantageously customized to meet different golf ball applications. Any of the acid copolymers discussed above are suitable for use as resins in producing the VNP compositions in accordance with the invention. Generally, the acid copolymer base resin(s), optional melt flow modifier(s), optional additional polymer component(s), and optional additive(s)/filler(s) are simultaneously or individually fed into a melt extruder, such as a single or twin screw extruder. Neutralization occurs in the melt or molten state in the mixer or extruder. The components are then blended in the mixer or the extruder prior to being extruded as a strand from the die-head.

Neutralization occurs by reacting the acid copolymer with a sufficient amount of cation source, in the presence of an organic acid or salt thereof, such that about 70 percent, preferably about 80 percent, of all acid groups present are neutralized. The acid polymer may also be at least partially neutralized prior to the above process. In one embodiment, the acid copolymer is reacted with the organic acid or salt thereof and the cation source simultaneously. In another embodiment, the acid copolymer is reacted with the organic acid or salt thereof prior to the addition of the cation source. For example, the acid copolymer may be melt-blended with an organic acid or a salt of the organic acid, and a sufficient amount of a cation source may be added to increase the level of neutralization of all the acid moieties (including those in the acid copolymer and in the organic acid) to about 70 percent, preferably about 80 percent. In yet another embodiment, the acid copolymer is reacted with only the cation source to neutralize about 70 percent to about 80 percent or points therebetween, of all acid groups present. However, any method of neutralization available to those of ordinary skill in the art may also be suitably employed.

The Let-Down Process

The present invention is also directed to methods of preparing the VNP compositions through letdowns of highly-neutralized polymers ("HNPs"). By the term, "highly-neutralized polymer," it is meant an olefin-based ionomer, such as an ethylene-based acid copolymer, generally formed with enough cation to neutralize greater than 80 percent, preferably greater than 90 percent, and more preferably 100 percent, of the acid groups in the polymer. Commonly, a stoichiometric excess of cation is added (enough to neutralize 150% or more of the acid groups in the polymer) to ensure high levels of neutralization.

Without being bound to any particular theory, it was discovered that VNPs having neutralization levels of about 70 percent to about 80 percent may be formed by modifying or "letting down" HNPs with acid-containing components. In particular, it has been found that by adding an acid-containing component to the HNP, the desired neutralization level is reduced. Advantageously, this aspect of the invention allows for the production of VNP compositions when the specific base resins used to make the VNPs and/or HNPs are not available.

The HNP is then blended with one or more acid-containing components to form a VNP composition. Generally, the HNP and acid-containing component(s) are blended in a mixer or an extruder. In one embodiment, a single acid-containing component is added to the HNP. In another embodiment, at least two acid-containing components are added to the HNP. In yet another embodiment, more than two acid-containing components are added to the HNP. The resultant blend of HNP and acid-containing component(s) produces a VNP having a neutralization level of about 70 percent to about 80 percent.

The HNP may be added to the blend in an amount of about 25 weight percent to about 95 weight percent, preferably about 40 weight percent to about 80 weight percent, and more preferably about 45 weight percent to about 75 weight percent, based on the total weight of the blend. When at least two acid-containing components are present in the blend, the HNP will generally be added in smaller amounts. For example, when two acid-containing components are present in the blend, the HNP is added in an amount of about 20 weight percent to about 50 weight percent, preferably about 25 weight percent to about 45 weight percent, based on the total weight of the blend. The acid-containing component(s) may be added to the blend in an amount of about 5 weight percent to about 50 weight percent, preferably about 10 weight percent to about 45 weight percent, and more preferably about 20 weight percent to about 30 weight percent, based on the total weight of the blend. However, as will be readily apparent to one of ordinary skill in the art, the amount of HNP and acid-containing component(s) added to the blend will vary depending on the type of resin used, the quantity of acid-containing ingredients used, and the desired neutralization level. Any amount of combination of components that lowers the neutralization of the HNP to about 70 percent to about 80 percent may be suitably employed.

When additional polymer components are present in a blend with the VNPs, the blend may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder.

Properties of the Composition

When formed into solid spheres, the compositions of the invention may have a COR of about 0.650 to about 0.820. In one embodiment, the COR of a solid sphere formed from a composition of the invention ranges from about 0.680 to about 0.810. In another embodiment, the COR ranges from about 0.700 to about 0.800. In yet another embodiment, the COR ranges from about 0.725 to about 0.780. In still another embodiment, the COR ranges from about 0.750 to about 0.770.

When formed into solid spheres, the compositions of the invention may have a hardness of about 20 Shore D to about 75 Shore D. In one embodiment, the hardness of a solid sphere formed from a composition of the invention ranges from about 30 Shore D to about 60 Shore D. In another embodiment, the hardness ranges from about 40 Shore D to about 50 Shore D.

The compositions of the invention, when formed into solid spheres, may have an Atti compression of about 10 to about 100. In one embodiment, the Atti compression of a solid sphere formed from a composition of the invention ranges from about 40 to about 90. In another embodiment, the Atti compression may range from about 50 to about 85. In yet another embodiment, the Atti compression ranges from about 60 to about 75.

Golf Ball Layer Formation

After the VNP composition is prepared, the composition is formed into pellets and maintained in such a state until molding is desired. If necessary, further additives and/or fillers, such as those discussed above, may be added and uniformly mixed before initiation of the molding process. The composition is then injected into a golf ball mold to form a golf ball layer. The golf ball layer may include a core layer, an intermediate layer, a cover layer, or combinations thereof.

The golf balls of the invention may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

In one embodiment, the golf ball layers are formed using injection molding. When injection molding is used, the VNP composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like.

Golf Ball Construction

As discussed briefly above, the compositions of the present invention may be used with any type of ball construction including, but not limited to, one-piece, two-piece, three-piece, and four or more piece designs, a double core, a double cover, an intermediate layer(s), a multilayer core, and/or a multi-layer cover depending on the type of performance desired of the ball. That is, the compositions of the invention may be used in a core, an intermediate layer, and/or a cover of a golf ball, each of which may have a single layer or multiple layers. In one embodiment, the compositions of the invention are formed into a core layer. In another embodiment, the compositions of the invention are formed into an intermediate layer. In yet another embodiment, the compositions of the invention are formed into a cover layer.

Golf Ball Core Layer(s)

The core or core layer(s) may be formed from the compositions of the invention. For example, a core formed from the composition of the invention may be covered with a castable thermoset or injection moldable thermoplastic material or any of the other cover materials discussed below. The core may have a diameter of about 0.5 inches to about 1.64 inches and the cover layer thickness may range from about 0.03 inches to about 0.12 inches.

When not formed from the compositions of the invention, any core material known to one of ordinary skill in that art is suitable for use in the golf balls of the invention. In particular, the core may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. In addition, the compositions of the invention may be incorporated into the core.

Golf Ball Intermediate Layer(s)

An intermediate layer, such as an outer core layer or inner cover layer, i.e., any layer(s) disposed between the inner core and the outer cover of a golf ball may be formed from the compositions of the present invention. An intermediate layer may be used, if desired, with a multilayer cover or a multilayer core, or with both a multilayer cover and a multilayer core. As with the core, the intermediate layer may also include a plurality of layers.

In one embodiment, the intermediate layer is formed, at least in part from the compositions of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches.

In another embodiment, the intermediate layer is covered by an inner cover layer, either of which may independently be formed from the compositions of the invention or other material that produces the desired performance results. The center may be formed from a composition of the invention or any of the other core materials previously discussed. The core may be covered by an outer core layer to form a core, which also may be formed form the compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the compositions of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters.

Golf Ball Cover Layer(s)

The cover provides the interface between the ball and a club. Properties that are desirable for the cover are good moldability, high moisture resistance, high abrasion resistance, high impact resistance, high tear strength, high resilience, and good mold release, among others. The cover layer may be formed, at least in part, from a composition of the invention. However, when not formed from the compositions of the invention, the cover may be formed from one or more homopolymeric or copolymeric materials as discussed in the section above pertaining to the intermediate layer. Golf balls according to the invention may also be formed having a cover of polyurethane, polyurea, and polybutadiene materials.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. Any of the golf ball layers may be surface treated by conventional methods including blasting, mechanical abrasion, corona discharge, plasma treatment, and the like, and combinations thereof.

Golf Ball Properties

The properties such as core diameter, intermediate layer and cover layer thickness, hardness, and compression have been found to affect play characteristics such as spin, initial velocity, and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight.

The preferred diameter of the golf balls is from about 1.680 inches to about 1.800 inches, more preferably from about 1.680 inches to about 1.760 inches. A diameter of from about 1.680 inches (43 mm) to about 1.740 inches (44 mm) is most preferred; however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

The compositions of the invention may be used in any layer of a golf ball. Accordingly, the golf ball construction, physical properties, and resulting performance may vary depending on the layer(s) of the ball that include the compositions of the invention.

Golf ball layers formed of the compositions of the invention may have a hardness of about 20 Shore D to about 75 Shore D. In one embodiment, the golf ball layer formed of the compositions of the invention has a hardness of about 30 Shore D to about 60 Shore D. In another embodiment, the golf ball layer formed of the compositions of the invention has a hardness of about 40 Shore D to about 50 Shore D.

In another aspect of the present invention, golf ball layers formed from the compositions of the invention may have a hardness of about 45 Shore C to about 85 Shore C. In one embodiment, the golf ball layer formed of the compositions of the invention has a hardness of about 50 Shore C to about 80 Shore C. In another embodiment, the golf ball layer formed of the compositions of the invention has a hardness of about 60 Shore C to about 75 Shore C.

The cores included in the golf balls of the present invention may have varying hardnesses depending on the particular golf ball construction. In one embodiment, the core hardness is about 20 Shore D to about 60 Shore D. In another embodiment, the core hardness is about 30 Shore D to about 50 Shore D.

The intermediate layers of the present invention may also vary in hardness depending on the specific construction of the ball. In one embodiment, the hardness of the intermediate layer is about 30 Shore D to about 65 Shore D. In another embodiment, the hardness of the intermediate layer is about 40 Shore D to about 55 Shore D.

As with the core and intermediate layers, the cover hardness may vary depending on the construction and desired characteristics of the golf ball. In one embodiment, the hardness of the cover layer is about 40 Shore D to about 65 Shore D. In another embodiment, the hardness of the cover layer is about 50 Shore D to about 60 Shore D.

Hardness measurements are made pursuant to ASTM D-2240 "Indentation Hardness of Rubber and Plastic by Means of a Durometer." The hardness of a core, cover, or intermediate layer may be measured directly on the surface of a layer or alternatively, at the midpoint of the given layer in a manner similar to measuring the geometric center hardness of a core layer that has been cut in half and the approximate geometric center of the core is measured perpendicular to the sectioned core. For example, the hardness of the inner cover layer may be measured at the midpoint of the layer after the ball has been cut in half. A midpoint hardness measurement is preferably made for the inner and intermediate cover layers. The midpoint hardness of a cover layer is taken at a point equidistant from the inner surface and outer surface of the layer to be measured. Once one or more cover or other layers surround a layer of interest, the exact midpoint may be difficult to determine, therefore, for the purposes of the present invention, the measurement of "midpoint" hardness of a layer is taken within plus or minus 1 mm of the measured midpoint of the layer. A surface hardness measurement is preferably made for the outer cover layer. In these instances, the hardness is measured on the outer surface (cover) of the ball.

Compression

Compression is an important factor in golf ball design. For example, the compression of the core can affect the ball's spin rate off the driver and the feel. In fact, the compositions and methods of the present invention result in golf balls having increased compressions and ultimately an overall harder ball. The harder the overall ball, the less deformed it becomes upon striking, and the faster it breaks away from the golf club.

As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring.

The Atti compression of golf balls formed from the compositions of the present invention may range from about 50 to about 120. In one embodiment, the Atti compression of golf balls formed from the compositions of the present invention range from about 55 to about 100. In another embodiment, the Atti compression of golf balls formed from the compositions of the present invention range from about 70 to about 90.

Coefficient of Restitution

The coefficient of restitution or COR of a golf ball is a measure of the amount of energy lost when two objects collide. The COR of a golf ball indicates its ability to rebound and accounts for the spring-like feel of the ball after striking. As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

Despite the decrease in average neutralization level, the VNP compositions of the present invention unexpectedly demonstrate comparable COR values when compared to HNP compositions. In this aspect, the present invention contemplates golf balls formed form the VNP compositions of the present invention having CORs from about 0.700 to about 0.850 at an inbound velocity of about 125 ft/sec. In one embodiment, the COR is about 0.750 to about 0.800, preferably about 0.760 to about 0.790, and more preferably about 0.770 to about 0.780. In another embodiment, the ball has a COR of about 0.800 or greater. In yet another embodiment, the COR of the balls of the invention is about 0.800 to about 0.815.

Solid spheres (1.55 inches) formed of the compositions of the invention may have a COR of at least about 0.790, preferably at least about 0.800. For example, the COR of solid spheres formed from the compositions of the invention ranges from about 0.810 to about 0.830. In one embodiment, a solid sphere formed from the composition of the invention has a COR of about 0.800 to about 0.825. In another embodiment, the COR of the solid sphere ranges from about 0.805 to about 0.815.

EXAMPLES

The following non-limiting examples demonstrate golf balls made in accordance with the present invention. The examples are merely illustrative of the preferred embodiments of the present invention, and are not to be construed as limiting the invention, the scope of which is defined by the appended claims.

Examples 1-7 are illustrative of solid spheres produced having at least one layer formed from the VNP compositions of the present invention. Various compositions were melt blended using the ingredients as given in Tables 1-7. The relative amounts of each ingredient are reported in weight percent, based on the combined weight of all ingredients. The VNP composition tested in each of the Examples has a neutralization level of about 70 percent to about 80 percent.

Each of the compositions was injection molded to form a golf ball layer. The CoR, compression, Shore D hardness, and Shore C hardness of the resulting balls were measured. The results are reported in Tables 1-7.

Example 1

Solid spheres were produced from a VNP composition including Dupont™ HPF 2000 and Honeywell A-C® 5120. The spheres prepared from the VNP composition were compared with spheres produced from compositions including Dupont™ HPF 2000 and Honeywell A-C® 5120 having varying neutralization levels outside of the VNP range of 70 percent to 80 percent. Properties and performance results are shown in Table 1 below.

TABLE 1

| | VNP Produced by HNP Letdown Using A-C ® 5120 | | | | |
|---|---|---|---|---|---|
| Formulation | Example 1 (VNP) | Comparative Example 1A | Comparative Example 1B | Comparative Example 1C | Comparative Example 1D |
| 1st Ingredient wt. % | HPF 2000 80 | HPF 2000 100 | HPF 2000 98 | HPF 2000 95 | HPF 2000 90 |
| 2nd Ingredient wt. % | A-C ® 5120 20 | A-C ® 5120 0 | A-C ® 5120 2 | A-C ® 5120 5 | A-C ® 5120 10 |
| Blend % Neutralization | 79.5 | 100.0 | 97.9 | 94.8 | 89.7 |
| CoR @ 125 ft/s | 0.796 | 0.859 | 0.845 | 0.844 | 0.831 |
| Atti Compression | 90 | 84 | 89 | 86 | 89 |
| Shore C Hardness | 79.6 | 78.7 | 78.5 | 77.0 | 76.5 |
| Shore D Hardness | 46.4 | 48.5 | 50.6 | 48.5 | 48.1 |

Example 2

Solid spheres were produced from a VNP composition including Dupont™ HPF 2000 and ExxonMobil ESCOR® AT320. The spheres prepared from the VNP composition were compared with spheres produced from HNP compositions including Dupont™ HPF 2000 and ExxonMobil ESCOR® AT320 having varying neutralization levels outside of the VNP range of 70 percent to 80 percent. Properties and performance results are shown in Table 2 below.

TABLE 2

VNP Produced by HNP Letdown Using ESCOR ® AT320

| Formulation | Example 2 (VNP) | Comparative Example 2A | Comparative Example 2B | Comparative Example 2C | Comparative Example 2D |
|---|---|---|---|---|---|
| 1$^{st}$ Ingredient | HPF 2000 | HPF 2000 | HPF 2000 | HPF 2000 | HPF 2000 |
| wt. % | 57 | 100 | 90 | 77 | 67 |
| 2$^{nd}$ Ingredient | ESCOR ®AT320 | ESCOR ®AT320 | ESCOR ®AT320 | ESCOR ®AT320 | ESCOR ®AT320 |
| wt. % | 43 | 0 | 10 | 23 | 33 |
| Blend % Neutralization | 76.7 | 100.0 | 95.7 | 89.3 | 83.5 |
| CoR @ 125 ft/s | 0.765 | 0.859 | 0.835 | 0.815 | 0.790 |
| Atti Compression | 69 | 84 | 84 | 79 | 78 |
| Shore C Hardness | 68.8 | 78.7 | 76.8 | 74.7 | 72.0 |
| Shore D Hardness | 43.0 | 48.5 | 49.5 | 47.5 | 44.4 |

Example 3

Solid spheres were produced from a VNP composition including Dupont™ HPF 2000 and Dow PRIMACOR® 5980I. The spheres prepared from the VNP composition were compared with spheres produced from compositions including Dupont™ HPF 2000 and Dow PRIMACOR® 5980I having varying neutralization levels outside of the VNP range of 70 percent to 80 percent. Properties and performance results are shown in Table 3 below.

TABLE 3

VNP Produced by HNP Letdown Using PRIMACOR ® 5980I

| Formulation | Example 3 (VNP) | Comparative Example 3A | Comparative Example 3B | Comparative Example 3C |
|---|---|---|---|---|
| 1$^{st}$ Ingredient | HPF 2000 | HPF 2000 | HPF 2000 | HPF 2000 |
| wt. % | 80 | 100 | 90 | 70 |
| 2$^{nd}$ Ingredient | PRIMACOR ®5980I | PRIMACOR ®5980I | PRIMACOR ®5980I | PRIMACOR ®5980I |
| wt. % | 20 | 0 | 10 | 30 |
| Blend % Neutralization | 74.4 | 100.0 | 86.8 | 62.9 |
| CoR @ 125 ft/s | 0.809 | 0.859 | 0.840 | 0.765 |
| Atti Compression | 87 | 84 | 88 | 89 |
| Shore C Hardness | 76.5 | 78.7 | 77.4 | 75.6 |
| Shore D Hardness | 48.3 | 48.5 | 48.9 | 48.0 |

Example 4

Solid spheres were produced from a VNP composition including Dupont™ HPF 2000 and oleic acid. The spheres prepared from the VNP composition were compared with spheres produced from compositions including Dupont™ HPF 2000 and oleic acid having varying neutralization levels outside of the VNP range of 70 percent to 80 percent. Properties and performance results are shown in Table 4 below.

TABLE 4

VNP Produced by HNP Letdown Using Oleic Acid

| Formulation | Example 4 (VNP) | Comparative Example 4A | Comparative Example 4B |
|---|---|---|---|
| 1$^{st}$ Ingredient | HPF 2000 | HPF 2000 | HPF 2000 |
| wt. % | 87 | 100 | 92 |
| 2$^{nd}$ Ingredient | Oleic Acid | Oleic Acid | Oleic Acid |
| wt. % | 13 | 0 | 8 |
| Blend % Neutralization | 79.6 | 100.0 | 87.0 |
| CoR @ 125 ft/s | 0.796 | 0.859 | 0.824 |
| Atti Compression | 46 | 84 | 72 |
| Shore C Hardness | 62.0 | 78.7 | 70.8 |
| Shore D Hardness | 35.4 | 48.5 | 43.2 |

Example 5

Solid spheres were produced from a VNP composition including Dupont™ HPC AD1043 and Arizona Chemical SYLFAT® 2LT. The spheres prepared from the VNP composition were compared with spheres produced from compositions including Dupont™ HPC AD1043 and Arizona Chemical SYLFAT® 2LT having varying neutralization levels outside of the VNP range of 70 percent to 80 percent. Properties and performance results are shown in Table 5 below.

TABLE 5

VNP Produced by HNP Letdown Using SYLFAT ® 2LT

| Formulation | Example 5 (VNP) | Comparative Example 5A |
|---|---|---|
| 1st Ingredient | HPC AD1043 | HPC AD1043 |
| wt. % | 90 | 100 |
| 2nd Ingredient | SYLFAT ® 2LT | SYLFAT ® 2LT |
| wt. % | 10 | 0 |
| Blend % Neutralization | 79.5 | 100.0 |
| CoR @ 125 ft/s | 0.635 | 0.694 |
| Atti Compression | 56 | 70 |
| Shore C Hardness | 61.2 | 71.9 |
| Shore D Hardness | 33.3 | 43.2 |

Example 6

Solid spheres were produced from a VNP composition including Dupont™ HPF 2000, Surlyn AD 1043, and ExxonMobil ESCOR® AT320. The spheres prepared from the VNP composition were compared with spheres produced from compositions including Dupont™ HPF 2000, Surlyn AD 1043, and ExxonMobil ESCOR® AT320 having varying neutralization levels outside of the VNP range of 70 percent to 80 percent. Properties and performance results are shown in Table 6 below.

TABLE 6

VNP Produced by HNP Letdown Using Surlyn AD1043 and ESCOR ® AT320

| Formulation | Example 6 (VNP) | Comparative Example 6A | Comparative Example 6B |
|---|---|---|---|
| 1st Ingredient | HPF 2000 | HPF 2000 | HPF 2000 |
| wt. % | 28 | 50 | 34 |
| 2nd Ingredient | Surlyn AD1043 | Surlyn AD1043 | Surlyn AD1043 |
| wt. % | 28 | 50 | 34 |
| 3rd Ingredient | ESCOR ® AT320 | ESCOR ®AT320 | ESCOR ® AT320 |
| wt. % | 44 | 0 | 32 |
| Blend % Neutralization | 71.7 | 100.0 | 80.9 |
| CoR @ 125 ft/s | 0.704 | 0.783 | 0.733 |
| Atti Compression | 59 | 72 | 69 |
| Shore C Hardness | 66.3 | 73.2 | 69.0 |
| Shore D Hardness | 41.5 | 47.0 | 43.8 |

Example 7

Solid spheres were produced from a VNP composition including Dupont™ HPF 2000, Surlyn AD1043, and oleic acid. The spheres prepared from the VNP composition were compared with spheres produced from compositions including Dupont™ HPF 2000, Surlyn AD1043, and oleic acid having varying neutralization levels outside of the VNP range of 70 percent to 80 percent. Properties and performance results are shown in Table 7 below.

TABLE 7

VNP Produced by HNP Letdown Using Surlyn AD1043 and Oleic Acid

| Formulation | Example 6 (VNP) | Comparative Example 6A | Comparative Example 6B |
|---|---|---|---|
| 1st Ingredient | HPF 2000 | HPF 2000 | HPF 2000 |
| wt. % | 44 | 50 | 46 |

TABLE 7-continued

VNP Produced by HNP Letdown Using Surlyn AD1043 and Oleic Acid

| Formulation | Example 6 (VNP) | Comparative Example 6A | Comparative Example 6B |
|---|---|---|---|
| 2nd Ingredient | Surlyn AD1043 | Surlyn AD1043 | Surlyn AD1043 |
| wt. % | 43 | 50 | 46 |
| 3rd Ingredient | Oleic Acid | Oleic Acid | Oleic Acid |
| wt. % | 13 | 0 | 8 |
| Blend % Neutralization | 77.3 | 100.0 | 85.4 |
| CoR @ 125 ft/s | 0.682 | 0.783 | 0.734 |
| Atti Compression | 21 | 72 | 53 |
| Shore C Hardness | 52.2 | 73.2 | 63.8 |
| Shore D Hardness | 29.4 | 47.0 | 38.3 |

Figure 1:
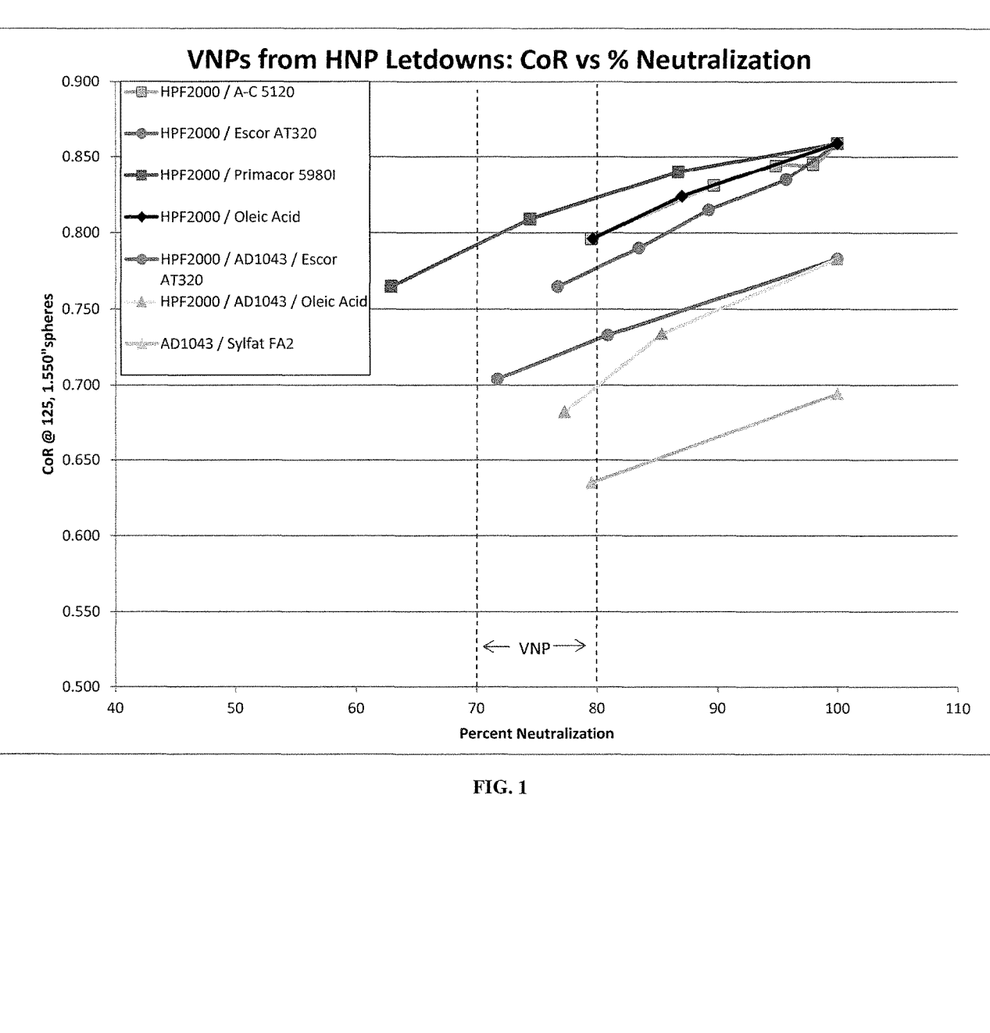
FIG. 1 is a graphical representation showing various CoR values for the compositions of the present invention.
Figure 2:
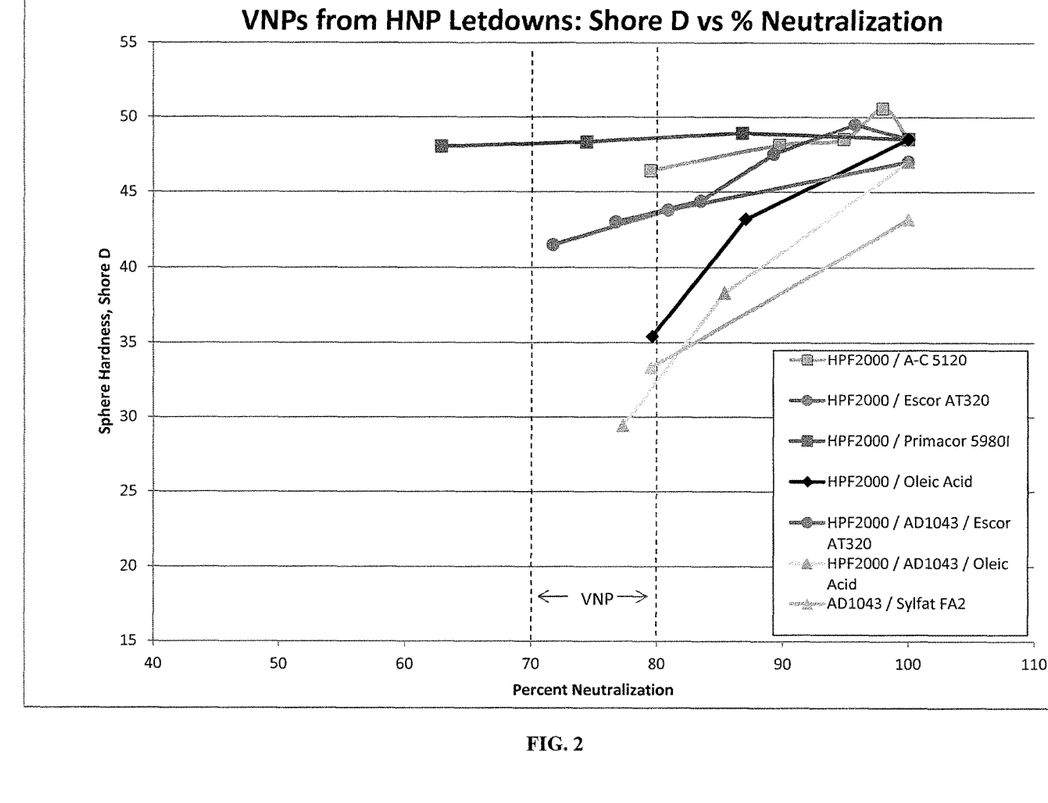
FIG. 2 is a graphical representation showing various Shore D hardness values for the compositions of the present invention.
Figure 3:
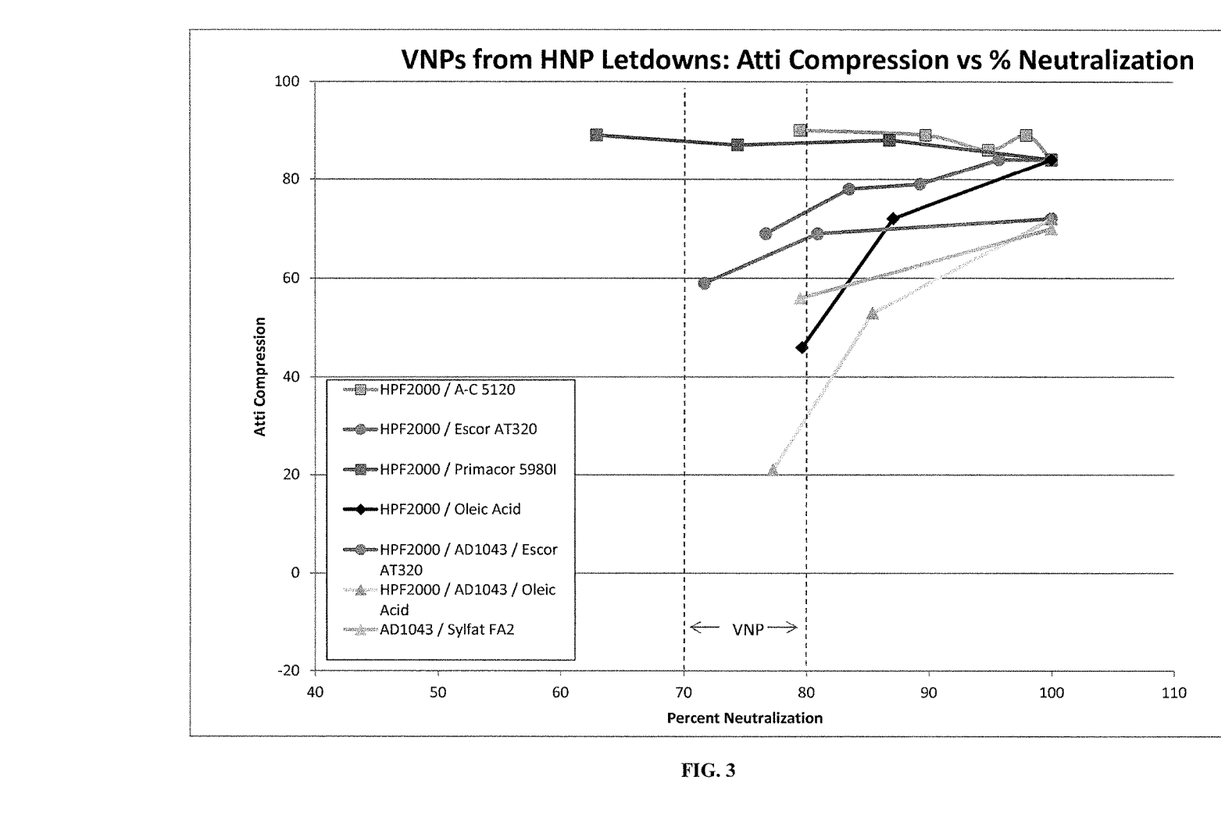
FIG. 3 is a graphical representation showing various Atti compression values for the compositions of the present invention.

As can be seen from the Examples, the VNP compositions of the present invention unexpectedly demonstrate superior properties despite the decrease in average neutralization. For example, as shown in FIG. 1, the CoR values of the VNP compositions display only a minimal drop as compared to the CoR values of the HNP compositions. Similarly, as shown in FIGS. 2 and 3, the VNP compositions demonstrate only slightly lower Shore D hardness and Atti compression values as compared to the Shore D hardness and Atti compression values of the HNP compositions. Advantageously, the VNP compositions of the present invention provide better processability and improved melt flow over HNP compositions, while only minimally sacrificing other properties.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball including:

a core;

an outer cover layer disposed about the core, wherein the outer cover layer is formed from a polymer composition comprising:

a blend of a highly neutralized polymer comprising greater than 90 percent of neutralized acid groups, an acid-containing wax having a Brookfield viscosity of less than 1,000 cps and a density of less than 0.95 g/cc, and at least one non-acid polymer selected from alkyl acrylate rubbers, wherein the polymer composition includes about 70 percent to about 80 percent of neutralized acid groups, and wherein the highly neutralized polymer is present in the blend in an amount of about 80 weight percent to about 95 weight percent and the acid-containing wax is present in the blend in an amount of about 5 weight percent to about 20 weight percent; and an inner cover layer disposed between the core and the outer cover layer.

2. The golf ball of claim 1, wherein the coefficient of restitution of the golf ball is about 0.750 to about 0.815.

3. The golf ball of claim 1, wherein the inner cover layer has a hardness of about 40 Shore D to about 70 Shore D.

4. The golf ball of claim 1, wherein the Atti compression of the golf ball is about 55 to about 110.

* * * * *